US009487855B2

(12) United States Patent
Zinnabold et al.

(10) Patent No.: US 9,487,855 B2
(45) Date of Patent: Nov. 8, 2016

(54) WEAR PROTECTION LAYER FOR PISTON RINGS

(75) Inventors: Michael Zinnabold, Burscheid (DE);
Marcus Kennedy, Dusseldorf (DE);
Marc-Manuel Matz, Kissing (DE)

(73) Assignee: Federal-Mogul Bursheid GmbH, Burscheid (DE)

( * ) Notice: Subject to any disclaimer, the term of this patent is extended or adjusted under 35 U.S.C. 154(b) by 417 days.

(21) Appl. No.: 14/127,356

(22) PCT Filed: Mar. 19, 2012

(86) PCT No.: PCT/EP2012/054797
§ 371 (c)(1),
(2), (4) Date: Jun. 3, 2014

(87) PCT Pub. No.: WO2013/007401
PCT Pub. Date: Jan. 17, 2013

(65) Prior Publication Data
US 2014/0284882 A1    Sep. 25, 2014

(30) Foreign Application Priority Data

Jul. 12, 2011  (DE) ...................... 10 2011 079 016

(51) Int. Cl.
| | |
|---|---|
| B22F 5/02 | (2006.01) |
| C23C 4/06 | (2016.01) |
| C23C 30/00 | (2006.01) |
| F16J 9/26 | (2006.01) |
| C22C 30/00 | (2006.01) |

(52) U.S. Cl.
CPC .............. *C23C 4/065* (2013.01); *C22C 30/00* (2013.01); *C23C 4/06* (2013.01); *C23C 4/067* (2016.01); *C23C 4/129* (2016.01); *C23C 30/00* (2013.01); *F16J 9/26* (2013.01)

(58) Field of Classification Search
None
See application file for complete search history.

(56) References Cited

U.S. PATENT DOCUMENTS

| | | | | |
|---|---|---|---|---|
| 5,019,332 A | * | 5/1991 | Wegman ................. | C22C 38/58 420/47 |
| 6,196,338 B1 | * | 3/2001 | Slaughter ................ | E21B 10/52 175/331 |
| 2007/0086910 A1 | * | 4/2007 | Liang ...................... | B22F 5/008 420/12 |
| 2012/0306158 A1 | * | 12/2012 | Kennedy ................... | C23C 4/06 277/442 |
| 2014/0234548 A1 | * | 8/2014 | Zimmermann ........... | B22F 9/04 427/446 |

FOREIGN PATENT DOCUMENTS

| | | |
|---|---|---|
| WO | WO 02/24970 A2 | 3/2002 |
| WO | WO 2010/115448 A1 | 10/2010 |

* cited by examiner

*Primary Examiner* — Humera Sheikh
*Assistant Examiner* — Seth Dumbris
(74) *Attorney, Agent, or Firm* — Robert L Stearns; Dickinson Wright, PLLC

(57) ABSTRACT

The present invention relates to a wear-resistant layer, which is preferably used on piston rings for internal combustion engines. The wear-resistant layer comprises: 15-25% by weight iron (Fe), 10-25% by weight tungsten carbide (WC), 30-40% by weight chromium (Cr), 10-25% by weight nickel (Ni), 10-25% by weight molybdenum (Mo), 1-10% by weight carbon (C), 0.1-2% by weight silicon (Si), wherein Cr is present in elemental form and/or as a carbide in the form of $Cr_2C_3$. A method for applying the wear resistant layer and a piston ring having such a wear resistant layer are also disclosed.

13 Claims, 4 Drawing Sheets

WEAR PROTECTION LAYER FOR PISTON RINGS

BACKGROUND OF THE INVENTION

1. Technical Field

The present invention relates to a wear-resistant layer, which is preferably used on piston rings for internal combustion engines. In particular, a wear-resistant layer in the form of a coating for such a piston ring is described as well as a method for applying the wear-resistant layer and for producing such a piston ring with a wear-resistant layer of such kind.

2. Related Art

Piston rings are sealing elements on the piston of an internal combustion engine or a piston compressor, for example. In an internal combustion engine, piston rings seal the gap between the piston head and the cylinder wall with respect to the combustion chamber. As the piston moves up and down, the outer peripheral surface of the piston ring slides along the cylinder wall, in constant springy contact therewith, and at the same time, because of the tilting movements of the piston, the piston ring oscillates in its piston ring groove, so that the flanks of the ring are alternately in contact with the upper and lower flank of the piston ring groove. In each case where friction bodies are sliding against one another, a certain amount of wear inevitably occurs, which may be more or less heavy depending on the material, and if the parts are unlubricated, this may result in scuffing scoring, and ultimately the destruction of the engine.

For manufacturing combustion engine parts that are subject to heavy stresses, such as piston rings, the most commonly used materials are cast iron and cast iron alloys. Piston rings, particularly compression rings are exposed to ever increasing loads in highly stressed internal combustion engines such as 4-stroke and 2-stroke engines. Such loads include a high peak compression pressure, a high combustion temperature and a reduction of lubricant film on the piston ring, all of which have a significant impact on functional properties such as wear, scuffing resistance, microwelding and corrosion resistance.

High ignition pressures, lower emissions and direct fuel injection represent further intensification of the loads on piston rings. The consequences are damage and plating of piston material, particularly on the lower piston ring flank.

As the mechanical and dynamic loads placed on piston rings continue to increase, more and more engine manufacturers are demanding piston rings made from high quality steel (tempered and high-alloyed like the material 1.4112). In this context, iron materials that contain less than 2.08% by weight carbon are referred to as steel. If the carbon content is higher, the material is called cast iron. Steel materials have better strength and toughness properties than cast iron, because there is no interference by free graphite in the basic microstructure. The most commonly used materials for manufacturing piston rings are martensitic steels with high chromium alloyed content.

In order to further improve the sliding and wear characteristics of piston rings with respect to the cylinder wall, the peripheral surface thereof is provided with coatings of various materials. Such coatings contain, for example, molybdenum, chromium, nickel, boron, silicon, aluminium, copper and/or carbon. One commercially available piston ring coating is known by the name MKP200 and contains a composite of molybdenum and $Cr_2C_3$—NiCr.

However, piston rings with such coatings are not ideally equipped to meet the demands of future engine generations in terms of resistance to wear, scuffing and corrosion. One reason for this is the high porosity of the protective layer, which is in the order of about 10-15%, and in a limitation on the proportion of wear-resistant components in the layer due to the spraying method used.

SUMMARY OF THE INVENTION

Consequently, an object of the present invention is to provide an improved wear-resistant layer and coating process, and a piston ring coated with such a wear-resistant layer, wherein an iron-based alloy is used together with molybdenum and tungsten carbide.

This object is solved according to the invention with a wear-resistant layer comprising the following elements in the proportions indicated:
  15-25% by weight iron (Fe),
  10-25% by weight tungsten carbide (WC),
  30-40% by weight chromium (Cr),
  10-25% by weight nickel (Ni),
  10-25% by weight molybdenum (Mo),
  1-10% by weight carbon (C),
  0.1-2% by weight silicon (Si),
wherein Cr is present in elemental form and/or as a carbide in the form of $Cr_2C_3$.

The ingredients are contained in such manner that the sum of all starting materials, components, ingredients, elements, and additives, includes those listed previously and those explicitly mentioned, amounts to 100% by weight in all cases. The proportion of starting materials, components, ingredients, elements, and additives may be adjusted by various methods known to a person skilled in the art.

In one embodiment of the present invention, the following carbide concentrations are contained for a total proportion of 15 to 50% by weight of carbides:
  10-25% by weight WC and
  5-30% by weight $Cr_2C_3$.

The use of carbides in the wear-resistant layer according to the invention the scuff and abrasion resistance is further increased.

In order to apply the wear-resistant layer, a thermal spray process is preferred, particularly preferred in this context is the HVOF process (derived from High-Velocity Oxygen Fuel), that is to say high-velocity flame spraying. The contents that are used to produce the wear-resistant layer ingredients are in the form of powder materials. The use of the HVOF process results in a particularly dense thermal coating on the substrate to be coated.

The particle sizes of the powders used are preferably in the range of 1-80 μm. The individual carbides preferably have a particle size of 0.1-5 μm, and may be embedded in a NiCr matrix. The carbides may be supplied either in the form of agglomerated, sintered particles or as primary precipitated carbides. They are preferably embedded in a NiCr matrix.

Regarding the physical properties of the wear-resistant layer (such as thermal conductivity, coefficient of thermal expansion), a minimum proportion of the iron-containing base system of 15% by weight produces a quasi-homogeneous system between the substrate and the coating. In this way, the thermal energy generated by mixed friction—particularly in the regions of top dead centre and bottom dead centre in a piston engine—is dissipated more efficiently, and an even thermal relaxation process is assured by the temperature variations present in an engine, for example.

Consequently, the use of the iron base alloy according to the invention as a piston ring base coating material together with molybdenum and tungsten carbide as a wear resistant layer results in a new type of piston ring with improved properties in terms of resistance to wear, scuffing and corrosion.

Thus, the present invention also provides a piston ring coated with the wear resistant layer. In this context, the piston ring to be coated may be any type of piston ring, for example a cast iron or steel piston ring. The piston ring is preferably in a thermal spraying process, preferably the HVOF process, and it is particularly preferably coated with wear resistant layer by means of the coating process according to the invention.

The layer thickness of the coating on such a coated piston ring is preferably in the range from 20-1000 μm.

According to one embodiment of the present invention, the hardness of the coating of a piston ring coated with the wear-resistant coating of the present invention is in the range from 550HV1-950HV1 (Vickers hardness test).

Coated piston rings of such kind are mainly used in internal combustion engines. Under these conditions, the sulphur-containing oils that are also present in such applications cause the molybdenum in the wear resistant layer of the piston ring to react with the sulphur to form $MoS_2$, which is also an excellent solid lubricant due to its crystal structure. This reaction helps to further improve the scuffing or scoring tendency of the tribosystem. $MoS_2$ has a typical layer lattice consisting of an array of sulphur-metal-sulphur planes parallel to the hexagonal base plane (001). Strong covalent bonds exist within these planes. However, the planes are only connected to each other via weak van der Waals interactions. This graphite-like anisotropic layer structure determines the low material hardness and the excellent fissility along the (001) planes, with the result that excellent emergency running features are achieved.

DETAILED DESCRIPTION

Examples

I. Wear-Resistant Coatings

The following wear-resistant coatings were compared with each other:
V1: A composite of Mo and $Cr_2C_3$-NiCr (commercial name MKP200, a standard product from Federal-Mogul) as reference; and
V2: A two-phase mixture (phase 1: Mo+$Cr_2C_3$-NiCr; phase 2: FeCr base+WC/$Cr_2C_3$-NiCr) wherein
V2a: mixing ratio phase 1 to phase 2=40/60
V2b: mixing ratio phase 1 to phase 2=25/75

Variant 1 was applied by plasma spraying, variants 2a and 2b were applied in an HVOF process.

Table 1 shows the chemical composition of the wear-resistant layers used in the test.

TABLE 1

Chemical composition of the various wear-resistant layers

| Variant # | Fe | WC | Cr | Ni | Mo | C | Si |
|---|---|---|---|---|---|---|---|
| | | | | (% by wt.) | | | |
| V1 | — | — | 17 | 16 | 60 | — | — |
| V2a | 22 | 12 | 33 | 17 | 13 | 3.6 | 0.5 |
| V2b | 19 | 14 | 35 | 18 | 15 | 3.1 | 0.4 |

II. Experiments

The microstructure, porosity and hardness, and the wear and scuffing performance were tested for the different variants.

In a first experiment, the microstructure and phase distribution were examined using light and scanning electron microscopy.

Figure 1:
FIG. 1 shows the microstructure of a coating of the prior art.

The microstructure of variant V1 through the light microscope in FIG. 1 (cross section etched according to Murakami process) shows that variant 1 has few unmelted particles, also homogeneously distributed $Cr_2C_3$ areas in a nickel-chromium matrix together with molybdenum. Porosity examinations revealed a porosity of variant 1 not exceeding 10%.

Figure 2:
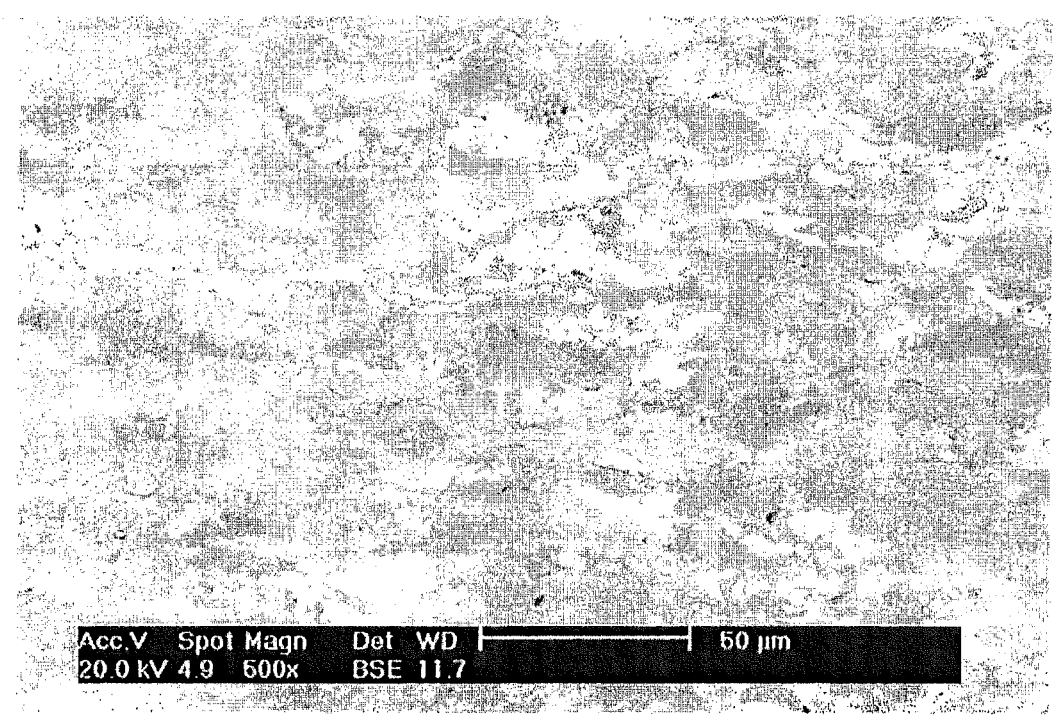
FIG. 2 shows the microstructure of a coating according to the present invention.
Figure 3:
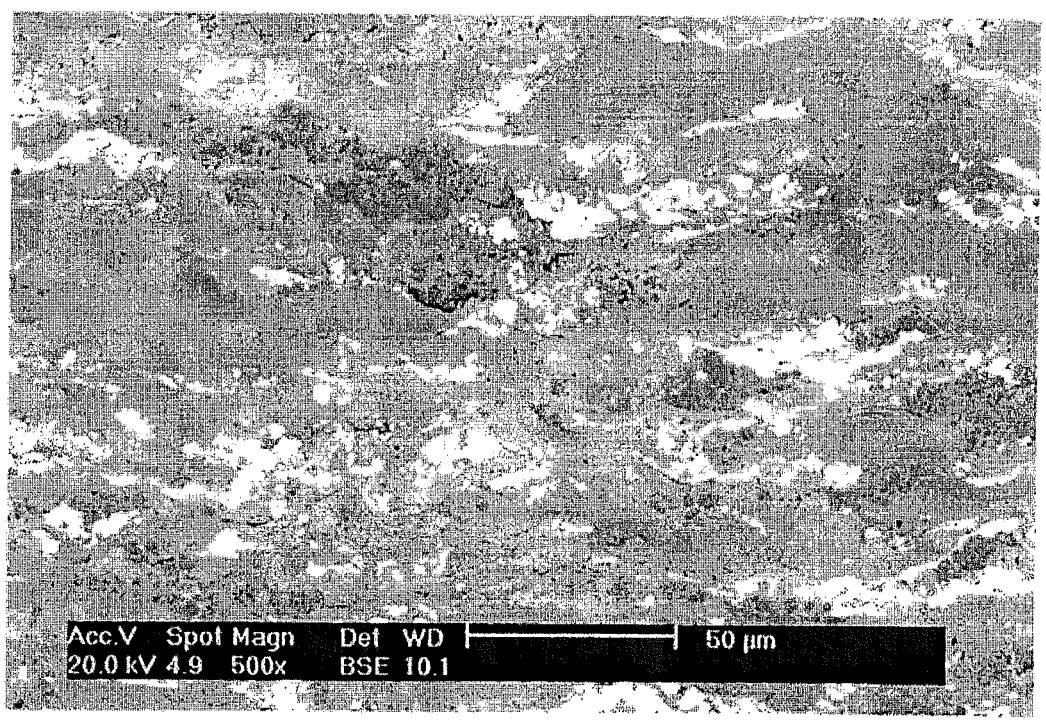
FIG. 3 shows the microstructure of another coating according to the present invention.

From FIGS. 2 and 3, which show the microstructures of variants V2a and V2b by REM, it may be seen that carbides and molybdenum are homogeneously distributed in variants V2a and V2b. WC and $Cr_2C_3$ areas in an NiCr matrix are also present. Unmelted particles are not visible. Porosity examinations revealed a porosity of approximately 1% in both variants V2a and V2b.

In FIGS. 1 to 3, the coarser, bright areas correspond to tungsten carbide, the very flat, also bright areas correspond to molybdenum, the light grey areas correspond to nickel and the dark grey areas represent $Cr_2C_3$ or the FeCr containing phases.

From FIG. 3, the larger coarse and light areas (corresponding to tungsten carbide) show clearly that an increase in phase 2, that is to say the content of FeCr base+WC/$Cr_2C_3$—NiCr, results in an increase in the carbide concentration the wear protection layer.

Table 2 summarises the calculated values with respect to porosity and mechanical properties.

TABLE 2

Properties of the various wear-resistant coatings

| Experiment # | Carbide proportion target (% by wt.) | Hardness HV 1 | Porosity % |
|---|---|---|---|
| V1 | 20 | 390-660 | 9 |
| V2a | 30 | 591-815 | 1 |
| V2b | 40 | 673-896 | 1 |

The following conclusions can be drawn based on table 2. First, the porosity was successfully lowered simply by using the HVOF process (V1 was applied in a plasma spray process), and secondly, an increase in carbide concentration results in an increase in the hardness of the wear-resistant layer.

Besides the tests described in the preceding, wear and scuff tests were performed outside the engine. For this, a segment of a coated sliding body was fixed in a holder, and oscillated against a counterbody with a constant force and speed in an oil bath. The results are shown in FIGS. 4 and 5, wherein FIG. 4 represents the wear on the ring and the cylinder lining after testing outside the engine in a lubricated ring/cylinder system, and FIG. 5 shows scuffing resistance in an inadequately lubricated ring/cylinder system.

Figure 4:
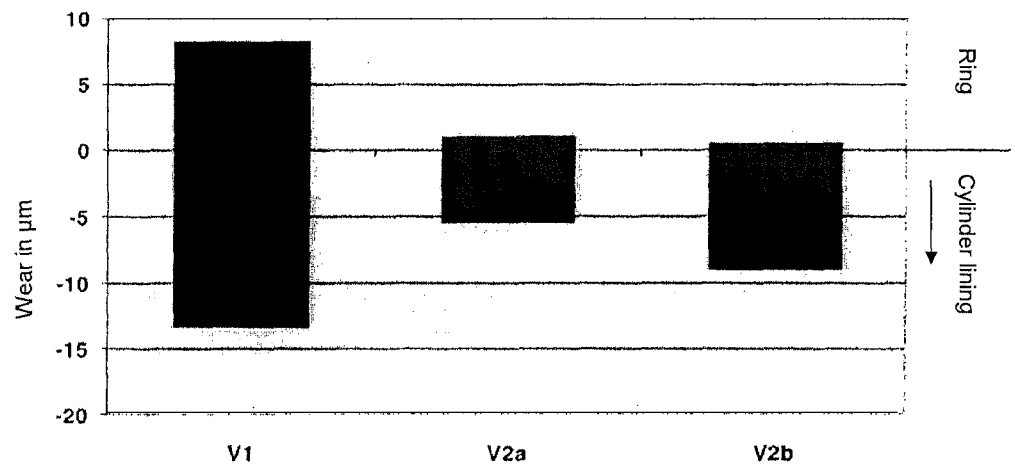
FIG. 4 shows the results of wear tests.
Figure 5:
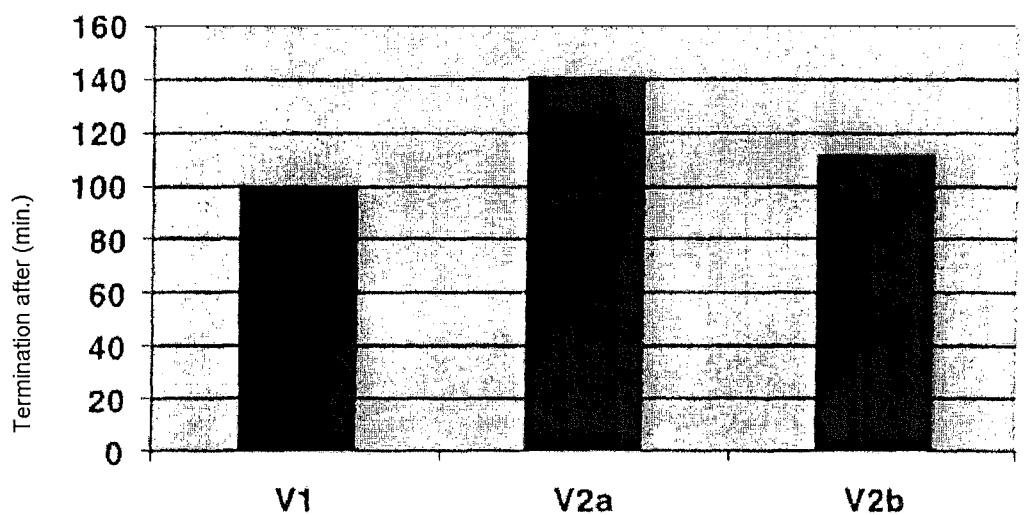
FIG. 5 shows the results of scuff tests.

With the use of a wear-resistant layer according to the invention having a modified composition with respect to the protective layer known from the prior art, it was possible to achieve significantly improved resistance to wear (see FIG. 4). This results in reduced ring and cylinder lining wear.

In another experiment, scuff behaviour was investigated. For this, in principle the same experimental setup was used as for the wear test. However, an inadequate lubrication condition was set up and the load was increased at constant time intervals. Measurement was stopped as soon as the coefficient of sliding friction reached >0.3. Variants V2a and V2b showed significantly better scuff behaviour than variant V1 (see FIG. 5). The lower proportion of carbide content and a lower degree of melting in variant V2b results in lower scuff resistance compared with V2a.

From the above experimental results it may be seen that the wear resistant layer according to the invention has significantly better properties and that a piston ring coated with wear resistant layer shows enhanced wear and scuff resistance.

The invention claimed is:

1. A wear resistant coating for piston rings, comprising:
15-25% by weight iron (Fe),
10-25% by weight tungsten carbide (WC),
30-40% by weight chromium (Cr),
10-25% by weight nickel (Ni),
10-25% by weight molybdenum (Mo),
1-10% by weight carbon (C),
0.1-2% by weight silicon (Si),
wherein Cr is present in elemental form and as $Cr_2C_3$, wherein the wear resistant coating contains a total proportion of 15 to 50% by wt. carbides, and the following carbide concentrations are contained:
10-25% by weight WC and
5-30% by weight $Cr_2C_3$.

2. A method for applying a wear-resistant layer according to claim 1, comprising the steps of:
   (i) providing the ingredients in powder form, and
   (ii) high-speed flame spraying (HVOF process) the ingredients onto a substrate.

3. The method according to claim 2, wherein the particle sizes of the elemental powders are in a range from 1-80 μm, and the particle size of the carbides used is in a range from 0.1-5 μm.

4. The method according to claim 3, wherein the carbides are present as agglomerated and sintered particles or as primary precipitated carbides.

5. The method according to claim 4, wherein the carbides are embedded in a NiCr matrix.

6. The method according to claim 2, wherein the substrate is a piston ring.

7. The method according to claim 6, wherein the piston ring is a cast iron or steel piston ring.

8. A piston ring coated with a wear-resistant layer according to claim 1.

9. The piston ring according to claim 8, wherein the layer thickness of the coating is in the range from 20-1000 μm.

10. The piston ring according to claim 8, wherein the hardness of the coating is in the range from 550HV1-950HV1.

11. The piston ring according to claim 8, wherein the coating is applied in an HVOF process.

12. The piston ring according to claim 8, wherein the coating is applied in a thermal spray process.

13. The piston ring according to claim 8, wherein the piston ring is a cast iron or steel piston ring.

* * * * *